June 26, 1962  H. J. KEEN ET AL  3,041,548
TEMPERATURE CONTROL SYSTEMS
Filed May 11, 1960  2 Sheets-Sheet 2

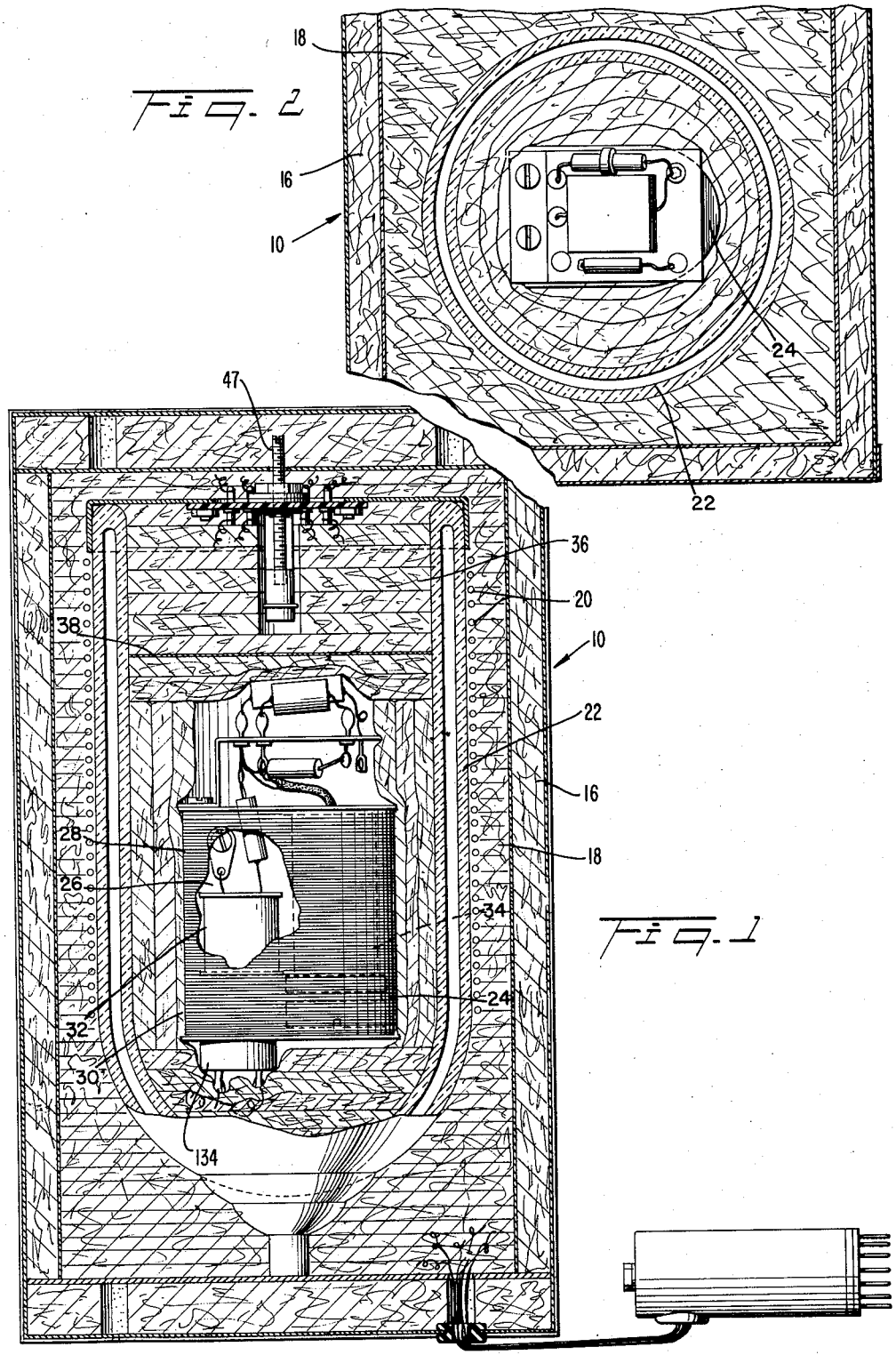

United States Patent Office 3,041,548
Patented June 26, 1962

3,041,548
TEMPERATURE CONTROL SYSTEMS
Harry J. Keen, Middletown, and Kay G. Sears, Keyport, N.J., assignors to Lavoie Laboratories, Inc., Morganville, N.J., a corporation of New Jersey
Filed May 11, 1960, Ser. No. 28,363
4 Claims. (Cl. 331—69)

This is a continuation-in-part of copending application Serial No. 760,382, Patent No. 2,975,261.

This invention relates to an improved temperature control system for constant temperature ovens, particularly to a system controlled by a piezoelectric crystal.

Piezoelectric crystals have the property of vibrating at a natural frequency depending upon their physical characteristics and temperature. The vibration of the crystal generates an electrical signal which oscillates at the mechanical resonant frequency of the crystal. A change in the temperature causes a change of mechanical resonant frequency of the crystal. This change in frequency per degree change in the temperature is variable for different crystals, and depends upon the material employed and the geometry of the crystal. A crystal is said to have a high temperature coefficient when this change of frequency is large per degree change of temperature and a low temperature coefficient when the change is small.

Precision temperature control can be obtained by having the temperature induced changes in the frequency of the oscillations of a crystal mounted in a constant temperature oven, control the means of heating the oven. Many systems have been disclosed to achieve this. In general, the temperature stabilization involves enclosing the crystal in a heat chamber or oven and attempting to maintain the temperature of the oven constant by using thermostats which switch the flow of current to a heating element off and on. When the temperature of the oven drops below a given temperature, the thermostat operates to switch on the current to the heating element and when the temperature of the oven exceeds a given value the current is switched off. In other words, control operates over a given range and the control of the current flow is on an on or off basis.

It is an object of the invention to provide a precision temperature control system for an improved constant temperature oven which employs a coarsely controlled heating element for bringing the oven close to the desired operating temperature, a finely controlled heating element for thereafter bringing the oven to the desired temperature and a third heating element controlled to generate heat in the oven at a variable rate equal to the loss of heat from the oven thereby maintaining the oven at a constant temperature by maintaining the mechanical resonant frequency of the crystal constant.

Other objects and features and advantages of the invention will be evident from the following detailed description of a preferred embodiment when read in connection with the accompanying drawings wherein:

FIG. 1 is a side sectional view of the constant temperature oven,

FIG. 2 is a sectional view taken approximately along the lines 2—2 in FIG. 1.

Figure 3:
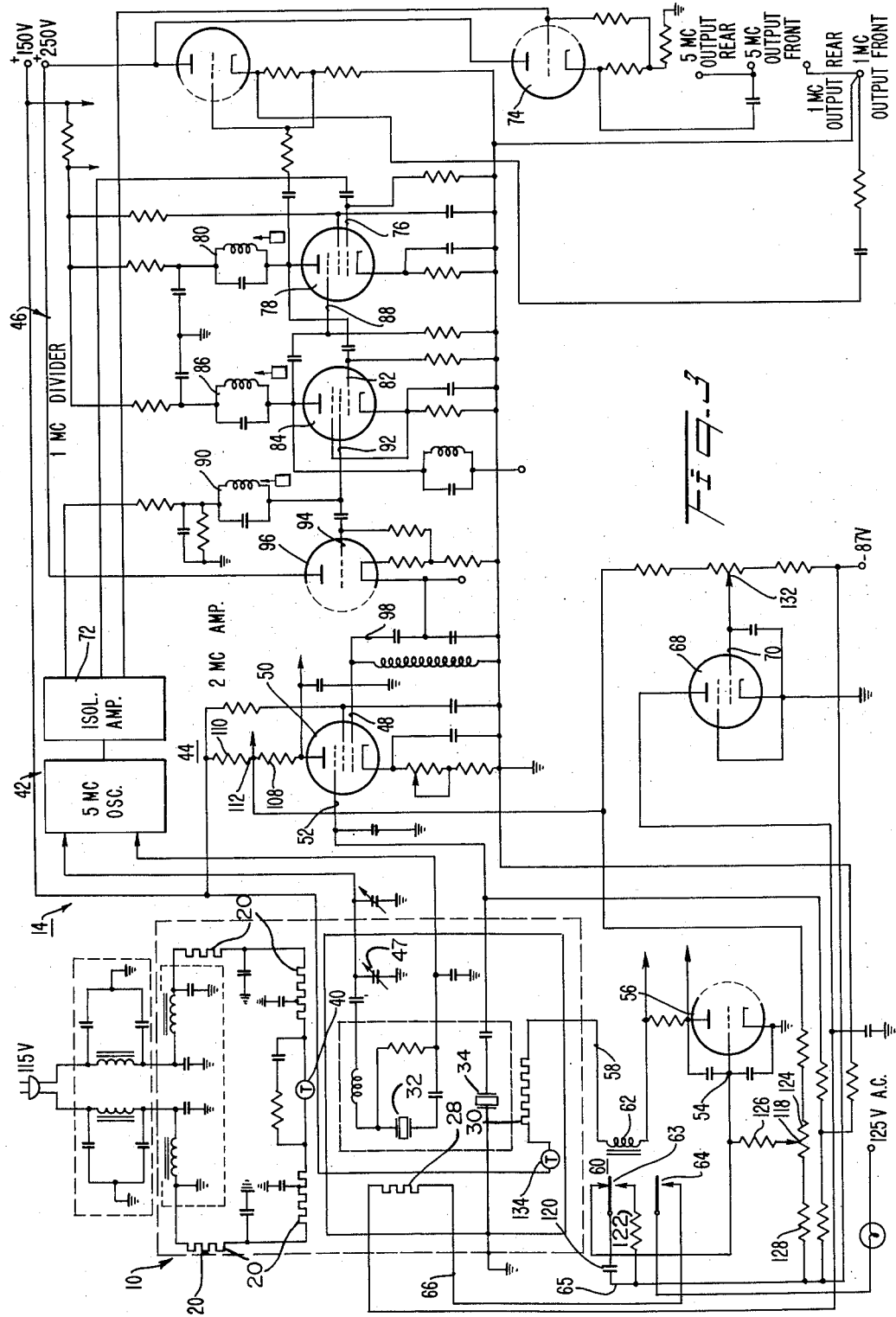
FIG. 3 is a schematic diagram of a constant temperature oven system with control circuitry in accordance with the invention.

The principal elements of the invention comprises a highly insulated oven, electrical heating elements for the oven mounted therein, and an electronic circuit for automatically controlling electrical energy to the heaters to maintain a constant preselected temperature in the oven.

Referring to FIG. 1 the oven 10 comprises an insulated outer container 16 in which an inner oven 18 is disposed. A first stage heater 20 encircles the inner oven 18. An insulated vacuum flask 22 is mounted in the inner oven 18 and an insulated heat storage block 24 defining a chamber 26 is disposed in the flask 22. A fast warm-up heater 28 and a proportional heater 30 surround the heat storage block 24 in the chamber 26 of which a controlled crystal 32 and a controlling crystal 34 are mounted. The vacuum flask 22 has double walls with an evacuated space therebetween for providing better heat insulation. The flask 22 is tapered to a double walled bottom at one end and closed at the other end with a heavily insulated cover 36 including layers of insulating material and sheets of metal foil as a radiant heat barrier. The three heaters 20, 28 and 30 are energized from separate electrical energy sources. The first stage heater 20 is controlled by a thermostat 40 set to deenergize the heater 20 approximately 15° below a desired temperature for example of 75° C. The other two heaters 28 and 30 are controlled by electronic-circuits 14.

Referring to FIG. 3 the electronic control circuit comprises a controlled crystal 32 and a controlling crystal 34 disposed in the chamber 26 and other circuit elements and circuitry. The controlled crystal 32 is a low thermal coefficient piezoelectric crystal which has a reference resonant frequency of a selected value, for example, 5 megacycles. The temperature coefficient of the controlled crystal 32 is made as small as practicable. The controlling crystal 34 on the other hand has a relatively high temperature coefficient, for example, about 50 cycles per degree C. change of temperature. The controlled crystal 32 is coupled to an oscillator circuit 42 and the controlling crystal 34 is coupled to a frequency comparison circuit 44. The controlled and the controlling crystal may be of the same resonant frequency or different frequencies. In the latter case the controlled crystal is generally the one that oscillates at the highest frequency and divider circuits 46 are provided to obtain a reference harmonic frequency comparable to the natural resonant frequency of the controlling crystal 34.

The control of the proportional heater 30 is based on the difference in reference frequency of oscillation at which the two crystals 32 and 34 vibrate when the temperature is not stabilized at the temperature at which both crystals oscillate at the same frequency. The fast warm-up heater 28 is controlled on an on and off basis and is also dependent on the aforesaid difference in reference frequency and for further energization of the heater 30. The crystal 34 with the high thermal coefficient senses a change in temperature with a change in output frequency before the controlled crystal 32 with the low thermal coefficient. The magnitude of these related changes determines the amount of electrical energy fed to the heater 30, and whether any is fed to heater 28. The crystal 34 thus leads the crystal 32 to the stabilized temperature by means of the diminishing difference between the referenced harmonic frequencies which both crystals provide until the referenced frequencies are the same. A trimmer 47 is provided in the vacuum flask cover 36 for minute adjustments in the frequency of the crystal 32.

In the example illustrated in the drawings the 5 megacycle signal generated by the controlled crystal 32 in the oscillator circuit 42 is frequency divided to a two megacycle frequency signal in the divider circuits 46. This two megacycle signal is fed to an input terminal 48 of a vacuum tube 50 of the frequency comparison circuit 44. At the same time a signal having a frequency displaced from two megacycles by a quantity related to a difference between the actual temperature and the desired operating temperature is received from the controlling crystal 34 by another input terminal 52 of the vacuum tube 50 of the comparison circuit 44. The comparison circuit 44 then generates a direct current signal whose amplitude is directly proportional to the difference in the frequencies of the received signal.

The D.C. signal is fed to an input terminal 54 of a control triode vacuum tube 56 in the energizing circuit 58 of the proportional heater 30. The tube 56 acts as a thermally controlled rheostat and switch to regulate electrical energy to the heater 30 to provide a temperature of 75° C. A relay 60 having a coil 62 in the energizing circuit 58 of the proportional heater 30 and a set of contacts 63 that operates when coil 62 is energized to set up a time delay circuit that on deenergization of the coil delays control tube 56 conduction thereby allowing the oven to cool slightly. This action is described in detail later in the specification. A second set of contacts 64, closed when coil 62 is energized, and in the energizing circuit 66 of the fast warm-up heater 28 permits the tube 56 to control energizing circuit 66 of the fast warm-up heater 28. The circuit 66 is subject to the further control of a thyratron tube 68 which is also connected in the circuit. An input terminal 70 of the thyratron 68 receives the D.C. signal from the comparison tube 50. The thyratron 68 is biased for the signal to cause the thyratron to conduct and act as a closed switch in the energizing of circuit 66 until a slightly lower temperature than the stabilized temperature of 75° C., say 73° C. is reached.

In greater detail, the controlled crystal 32 drives a five megacycle oscillator 42, which feeds an isolation amplifier 72. The isolation amplifier feeds a cathode follower amplifier 74 acting as a source of precisely controlled five megacycle signals. In addition, the isolation amplifier is coupled to the control grid of a pentode vacuum tube 78 acting as a first stage amplifier and as a frequency divider in the divider circuits. The five megacycle signal received on the first control grid 76 is nonlinearly amplified by the vacuum tube 78 to a signal for transmission through a second stage amplifier of the divider circuits. A one megacycle signal, selected by tank circuit 80 is received by the control grid of a pentode vacuum tube which generates a signal rich in harmonics. A four megacycle tank circuit 86 connected to the anode of the pentode tube 84 selects a four megacycle signal which is fed back to the suppressor grid 88 of the pentode vacuum tube 78. A heterodyne action takes place between the five megacycles signal received on the control grid 76 and the four megacycle signal received on the suppressor grid 88, which generates a beat frequency of one megacycle. The one megacycle signal is amplified and selected by the tank circuit 80 for transmission to the control grid of the pentode tube 84. This tube, in addition to generating the four megacycle harmonic, generates a two megacycle harmonic. The two megacycle signal is selected and amplified by a two megacycle tank circuit 90 connected to the screen grid of the pentode tube is fed to a control grid of a cathode follower amplifier 96.

The two megacycle signal is fed from the cathode via a two megacycle filter 98 to the control grid 48 of a gated beam detector and the frequency comparison tube 50. Sharp current pulses are fed from the suppressor grid 52 by this tube to the controlling crystal 34 to shock excite it into vibrating at its natural frequency for the ambient temperature. The loose coupling does not force the oscillation and therefore the frequency of the signal generated by the controlling crystal 34 is at its own natural resonant frequency. This signal is fed back to the grid 52 of the tube 50 and will be in phase with the initiating pulse if the natural frequency of the controlling crystal 34 at the existing temperatures is equal to standard frequency of the controlled crystal 32 from the cathode follower amplifier 96. The comparison tube 50 has the property of passing unidirectional pulses of negative polarity from its anode when periodically varying signals are present on both its control 48 and suppressor 52 grids. Maximum amplitude pulses are transmitted from its anode when signals of the same frequency and in phase are present on both grids 48 and 52, and the amplitude of the current pulses decreases as a frequency difference with consequent phase difference increases. Thus when the chamber 26 is exactly at operating temperature, the controlling crystal 34 will be exactly on frequency and maximum plate current will be drawn by the tube through the load resistors 108 and 110. Any change in oven temperature will cause a change in the plate current with a consequent change in potential at the junction 112 of the resistors. This change in potential is applied as a controlling voltage to the grid 54 of the control tube 50 through a bias adjusting potentiometer 118 and a resistor network, returning to a negative voltage supply of minus 87 volts. The proportional heater 30 is energized by connection between the 150 volt supply and the ground provided when the control tube 56 is conducting, the control tube acting as an electronic rheostat, its resistance varying with the signal control voltage applied to the grid 54.

When the oven 10 is initially energized, power is applied to the first stage heater 20 which heats the outer container 16 to a temperature approximately 15° centigrade below the inner oven 18 operating temperature. After this temperature is attained the heater 20 will cycle, controlled by its thermostat 40.

During this period the proportional heater 30 has also been energized, and the control tube 56 conducts heavily enough to energize the relay 60, the coil 62 of which is connected in series with the control tube 56 and the proportional heater 30. The thyratron 68 is also connected to the plate of the comparison tube 50 and in parallel with the control tube 56. The potential divides and is applied to control tube and to the thyratron control grid 70 causing the thyratron 68 to conduct to energize the fast warm-up heater 28 with the 125 volt A.C. supply applied through the contacts 64 of the relay 60 which were closed by the energization of the relay coil 62 when control tube 56 conducts.

When the chamber 26 reaches the operating temperature and over-shoot point, the current through control tube 56 is reduced to a value which does not energize the relay coil 62, sufficiently to close the contacts 63 and 64 to their energized condition thereby deenergizing the fast warm-up and proportional heaters and extinguishing the thyratron 68.

Beside controlling the operation of the fast warm-up heater 28, the relay 60 also controls the operation of a capacitor 120 and a resistor 122 comprising a circuit 65 having a long time constant in the circuit of contacts 63.

During the initial warm-up period when the relay 60 is in its energized condition, the capacitor 120 is discharged through the resistor 122 so that when the relay is deenergized a cut-off bias of minus 87 volts is applied to the grid 54 of the control tube 56. The capacitor 120 begins to charge through resistors 124, 126 and 128 in the grid circuit of the control tube 56, however, the long time constant of the charge path of the circuit 65 keeps the control tube 56 in a cut-off condition long enough for the chamber 26 to cool slightly. The potentiometer 118 in the control grid circuit 54 of the control tube 56 is adjusted so that when the capacitor 120 charges sufficiently to allow the control tube 56 to conduct, the thyratron 68 will fire, and electrical energy will be applied to the fast warm-up heater 28 as well as to the proportional heater 30. The fast warm-up heater 28 may cycle a few times before the oven temperature stabilizes, however, the thermal oscillation decays rapidly because the resistor 122 prevents the capacitor 120 from completely discharging except during the initial warm-up period.

When the oven stabilizes, the current through the control tube 56 is sufficient to keep the relay energized, and losses in the chamber 26 are immediately sensed by the controlling crystal 32 and a proportionate quantity of energy is applied to the heater to replace the heat loss.

However, the bias on the grid 70 of the thyratron 68 is adjusted by means of a pot 132 so that the tube does not conduct and the fast warm-up heater 28 is disabled, and the proportional heater 30 is continuously energized to provide heat that equals the loss of heat from the oven.

An over shoot thermostat 134 is provided in series with the proportional heater 30 to disconnect it from its source of electrical energy in case a malfunction causes it to over shoot its selected temperature. As the fast warm-up heater 28 is energized through relay contacts 64 closed by energization of the proportional heater 30 this thermostat 134 also cuts off the fast warm-up heater 28 from its energy source.

The improved oven 10 thus provides a single chamber 26 for mounting both piezoelectric crystals 32 and 34 thereby insuring that both crystals will be subjected to the same temperature. In addition, the heaters are cascaded, the first stage heater 20 encircling the inner oven 18 and the fast warm-up and the proportional heaters encircling the heat storage block 24 in which the piezoelectric crystals are mounted. The extension of the electronic fine control to the fast warm-up heater 28 provides a larger heating capacity for maintaining exact heat stability. Over shoot protection based on the stable characteristics of the thermostat is retained.

While only one embodiment of the invention has been shown and described in detail, there will be obvious to those skilled in the art many modifications and variations accomplishing the foregoing object, realizing many or all of the advantages but which do not depart essentially from the spirit of the invention. Thus the description has been by way of example and not intended to restrict the scope of the invention as hereinafter claimed.

What we claim and desire to secure by Letters Patent is:

1. In a constant temperature oven, an improved temperature control system for raising the temperature and maintaining it at a preselected temperature level in said oven with electrical energy from a plurality of outside sources comprising: a first stage heater means electrically connected for energization by a first said outside source; thermostat means mounted in said oven and operably connected for breaking said electrical connection between the first stage heater and the first outside source approximately 15° below the preselected temperature level; a fast warm-up heater means electrically connected for energization by a second said outside source, a thyratron tube means electrically connected in series with said fast warm-up heater and between said second outside source and ground for breaking said connection approximately 2° below said preselected temperature level when said tube is biased to nonconduction; a proportional heater means electrically connected for energization by a third outside source, a control tube means electrically connected in series with said proportional heater and between said third outside source and ground for continuously varying the conduction of said tube according to its bias and thereby varying the resistance in said connection to raise the temperature to said preselected temperature level and there maintain said temperature by energization of said proportional heater proportionally to the heat loss from said oven; and tube biasing means for biasing said thyratron and control tube means comprising a standard frequency source, a piezoelectric crystal means mounted in said oven and having a high temperature coefficient and a natural oscillation frequency at the preselected temperature of said standard frequency source, said natural oscillation frequency varying directly and substantially with the temperature in said oven, and a frequency comparison tube means connected to receive said standard temperature varied frequencies and generate therefrom an output potential that varies inversely as the magnitude of the differences between said frequencies, said potential being connected to said control and thyratron tubes for biasing said tubes to conduction and nonconduction in accordance with the magnitude differences of said frequencies and thereby connecting and disconnecting said heaters with said outside sources of electrical energy to energize said heaters to heat said oven according to the temperature in said oven relative to said preselected temperature level.

2. An improved temperature control system as described in claim 1, characterized in that said standard frequency source comprises a second piezoelectric output mans mounted in said oven and having a low temperature coefficient, said piezoelectric crystal means having a natural oscillation frequency that varies little with the temperature in comparison with said high coefficient piezoelectric means.

3. An improved temperature control system as described in claim 1, wherein means for preventing overshoot of said preselected temperature level is connected with said control and thyratron tube means and comprises: a long time constant circuit means parallelly connected with said biasing control potential to said control tube means; a relay coil connected in series with said control tube means and energized when said tube means conducts; a set of relay contacts in said connection between said second outside source and said fast warm-up heater that is closed by energization of said relay coil and opened when said relay coil is deenergized, thereby disconnecting said fast warm-up heater when said control tube is not conducting; and a set of relay contacts connected in said long time constant circuit means and actuated by said relay coil when deenergized to connect said control tube to a cut-off bias from a fourth said outside source to cut-off said control tube, and said relay coil when energized disconnecting said cut-off bias from said control tube but the long time constant circuit means keeping said control tube cut-off for the time to energize the long time constant circuit by said biasing potential from said frequency comparison tube.

4. An improved temperature control system as described in claim 1, wherein means for preventing a malfunction overshoot of said preselected temperature level comprises a thermostat mounted in said oven and operably connected for breaking said electrical connection between said proportional heater and said third outside source thereby disabling both said proportional heater and coil fast warm-up heater at about 1° of overshoot.

References Cited in the file of this patent
UNITED STATES PATENTS

| | | |
|---|---|---|
| 1,907,132 | Thurston | May 2, 1933 |
| 2,167,480 | Hansell | July 25, 1939 |